(12) United States Patent
Xu et al.

(10) Patent No.: US 12,056,155 B2
(45) Date of Patent: Aug. 6, 2024

(54) METHOD FOR CROSS-NODE CLONING OF STORAGE VOLUME, DEVICE, APPARATUS AND STORAGE MEDIUM

(71) Applicant: INSPUR SUZHOU INTELLIGENT TECHNOLOGY CO., LTD., Jiangsu (CN)

(72) Inventors: Yuchao Xu, Jiangsu (CN); Zhiguo Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/278,383

(22) PCT Filed: Jan. 27, 2022

(86) PCT No.: PCT/CN2022/074365
§ 371 (c)(1),
(2) Date: Aug. 22, 2023

(87) PCT Pub. No.: WO2023/050665
PCT Pub. Date: Apr. 6, 2023

(65) Prior Publication Data
US 2024/0037120 A1 Feb. 1, 2024

(30) Foreign Application Priority Data
Sep. 28, 2021 (CN) .......................... 202111141286.1

(51) Int. Cl.
G06F 16/20 (2019.01)
G06F 11/14 (2006.01)
G06F 16/27 (2019.01)

(52) U.S. Cl.
CPC .......... *G06F 16/27* (2019.01); *G06F 11/1469* (2013.01); *G06F 2201/84* (2013.01)

(58) Field of Classification Search
None
See application file for complete search history.

(56) References Cited

U.S. PATENT DOCUMENTS

| 5,852,715 A | * | 12/1998 | Raz | ...................... G06F 11/1466 709/201 |
| 11,281,492 B1 | * | 3/2022 | Rebeja | ................... G06F 9/5077 |

(Continued)

FOREIGN PATENT DOCUMENTS

| CN | 107615255 A | 1/2018 |
| CN | 111611109 A | 9/2020 |

(Continued)

*Primary Examiner* — Jau Shya Meng
(74) *Attorney, Agent, or Firm* — IPro, PLLC (57) ABSTRACT

The present application provides a method for cross-node cloning of a storage volume, a device, apparatus and a storage medium. The method includes: creating AEP storage in a node of a cluster by using pmem-csi, and monitoring whether a clone volume of the AEP storage exist in other nodes of the cluster, in response to that a clone volume of the AEP storage is monitored in the other nodes of the cluster, stopping the AEP storage and the clone volume; creating a snapshot of the AEP storage, and recovering the AEP storage; and starting the clone volume after transmitting snapshot data of the AEP storage to the clone volume. By using the solution of the present application, the problem of performing application migration and data backup of an AEP storage volume used in a cloud platform may be solved.

14 Claims, 3 Drawing Sheets

(56) References Cited

U.S. PATENT DOCUMENTS

| | | | | |
|---|---|---|---|---|
| 2004/0220971 A1* | 11/2004 | Kaushik | ............... | G06F 11/1464 |
| 2010/0260241 A1* | 10/2010 | Kim | .................... | H04W 28/06 |
| | | | | 375/259 |
| 2015/0331755 A1* | 11/2015 | Morgan | .............. | G06F 11/1469 |
| | | | | 707/646 |
| 2019/0005056 A1* | 1/2019 | Redko | ................... | G06F 16/128 |
| 2019/0073372 A1 | 3/2019 | Venkatesan et al. | | |
| 2019/0294352 A1* | 9/2019 | Prasad | ................ | G06F 12/0607 |
| 2020/0073765 A1 | 3/2020 | Tanwer et al. | | |
| 2021/0019207 A1 | 1/2021 | Niles et al. | | |
| 2021/0064486 A1* | 3/2021 | Rana | ................... | G06F 11/1484 |

FOREIGN PATENT DOCUMENTS

| | | |
|---|---|---|
| CN | 111736764 A | 10/2020 |
| CN | 113032091 A | 6/2021 |
| CN | 113590049 A | 11/2021 |

\* cited by examiner

METHOD FOR CROSS-NODE CLONING OF STORAGE VOLUME, DEVICE, APPARATUS AND STORAGE MEDIUM

This application claims priority to and benefits of Chinese Patent Application Serial No. 202111141286.1, and the title of "a method for cross-node cloning of a storage volume, device, apparatus and storage medium" filed with the State Intellectual Property Office of P. R. China on Sep. 28, 2021, the entire content of which is incorporated herein by reference.

FIELD

The present disclosure relates to the technical field of computers and, more particularly, to a method for cross-node cloning of a storage volume, a device, an apparatus and a storage medium.

BACKGROUND

In the age of cloud computing, more and more enterprises and individuals use Kubernetes (an open source application, which is used for managing containerization on a plurality of hosts in a cloud platform. The purpose of the Kubernetes is to make deployment of a containerized application simple and efficient, and one mechanism of deployment, planning, updating and maintenance for application is provided by the Kubernetes), and the Kubernetes has outstanding performance in applications of various scenarios. The performance of the application is also a guarantee to ensure that a service is capable to be provided to the outside. Wherein, improving the performance of storage plays a crucial role in the process of improving application performance. Apache Pass (AEP) is a new type of non-volatile Optane Memory apparatus that is launched by Intel. AEP has the advantages of lower price relative to Dynamic Random Memory (DRAM) and higher performance compared with Solid State Disk (SSD). Persistent Memory Container Storage Interface Driver (pmem-csi, a csi storage driver, which provides a local persistent memory as a file system volume to a container application program) is a storage plug-in that applies the AEP to the Kubernetes. This plug-in supports the creation and deletion of a storage volume, as well as mounting and unloading functions of the storage volume. However, when using a storage volume created by the pmem-csi, it is not capable to perform cross-node backup on the storage volume, because the AEP is a local storage and cannot clone the AEP storage volume cross-node.

SUMMARY

In view of this, the purpose of embodiments of the present application is to provide a method for cross-node cloning of a storage volume, a device, an apparatus and readable medium. By using the technical solution of the present application, the problem of application migration and data backup of an AEP storage volume used in a cloud platform is able to be solved.

Based on the above-mentioned purpose, an aspect of embodiments of the present application provides a method for cross-node cloning of a storage volume, the method includes the following steps:

by using pmem-csi, creating AEP storage in a node of a cluster, and monitoring whether a clone volume of the AEP storage exist in other nodes of the cluster;

in response to that a clone volume of the AEP storage is monitored in the other nodes of the cluster, stopping the AEP storage and the clone volume;

creating a snapshot of the AEP storage, and recovering the AEP storage; and starting the clone volume after transmitting snapshot data of the AEP storage to the clone volume.

According to an embodiment of the present application, the method further includes:

according to a threshold size, dividing the snapshot data of the AEP storage into a plurality of data slices.

According to an embodiment of the present application, the step of, starting the clone volume after transmitting snapshot data of the AEP storage to the clone volume includes:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume, until all the data is successfully stored in the clone volume.

According to an embodiment of the present application, the method further includes:

in response to the AEP storage receiving the response message of storing unsuccessfully that sent by the clone volume, stopping the clone operation, and sending a warn of cloning unsuccessfully.

According to an embodiment of the present application, the step of, in response to the AEP storage receiving the response message of storing unsuccessfully that sent by the clone volume, stopping the clone operation, and sending a warn of cloning unsuccessfully includes:

the warn of cloning unsuccessfully is sent to the administrator's mobile device and e-mail box via the network, and displayed on the display device where the AEP storage is located.

According to an embodiment of the present application, the step of, in response to that a clone volume of the AEP storage is monitored in other nodes of the cluster, stopping the AEP storage and the clone volume includes:

in response to that the clone volume of the AEP storage is monitored in other nodes of the cluster, by using a freeze command: fsfreeze-freeze, freezing the AEP storage and the clone volume.

According to an embodiment of the present application, the step of, creating a snapshot of the AEP storage, and recovering the AEP storage includes:

by means of a name of the AEP storage, finding a mapped host directory;

by means of a liswatch mechanism, acquiring data of the AEP storage in the host directory, wherein the data include a capacity of the AEP storage;

setting a name of a snapshot to be created, and transmitting the name, the capacity and a directory parameter of the snapshot into a Logical Volume Manager (lvm, groups partitions of one or more hard disks logically, which is equivalent to a large hard disk for use. When the space of the hard disk is not enough, other partitions of the hard disk may continue to be added, so that dynamic management of the disk space is able to be realized, which has great flexibility compared with ordinary disk partitions) snapshot interface to create the snapshot of the AEP storage;

in response to that the snapshot of the AEP storage is created, recovering the AEP storage.

According to an embodiment of the present application, the lvm snapshot interface is lvcreate-L xxxxGB-s-n lv_image_snap/dev/vg_image/lv_image, wherein -L xxxxGB is the size of the snapshot to be created, -s is the snapshot to be created, -n lv_image_snap is the snapshot to be created with the name of lv_image_snap, and/dev/vg_image/lv_image is a logical volume of the snapshot to be created.

According to an embodiment of the present application, the step of, by using the pmem-csi, creating the AEP storage in a node of the cluster, and monitoring whether the clone volume of the AEP storage exist in other nodes of the cluster includes:

on the basis of a listwatch mechanism of Kubernetes, monitoring data of the storage volume in other nodes of the cluster;
 determining whether the monitored data carry a node datum tag of the AEP storage;
 in response to that the node datum tag of the AEP storage is carried by the monitored data, determining that the storage volume in other nodes is a clone volume of the AEP storage.

According to another aspect of the embodiments of the present application, a device for cross-node cloning of a storage volume is provided, the device includes:

a monitor module, configured to create AEP storage in a node of a cluster by using pmem-csi, and monitor whether a clone volume of the AEP storage exist in other nodes of the cluster;
 a stop module, configured to stop the AEP storage and the clone volume in response to that a clone volume of the AEP storage is monitored in other nodes of the cluster;
 a creation module, configured to recover the AEP storage, after creating a snapshot of the AEP storage;
 a transmission module, configured to start the clone volume, after transmitting snapshot data of the AEP to the clone volume.

According to an embodiment of the present application, the device further includes a dividing module which is configured for:

according to a threshold size, dividing the snapshot data of the AEP storage into a plurality of data slices.

According to an embodiment of the present application, the transmission module is further configured for:

sending one data slice of the snapshot data of the AEP storage to the clone volume;
 by the clone volume, storing the received data slice, and sending a response message to the AEP storage;
 in response to the AEP storage receiving the response message of storing successfully that sent by the clone volume, sending next data slice of the snapshot data of the AEP storage to the clone volume, until all the data is successfully stored in the clone volume.

According to an embodiment of the present application, the apparatus further includes a warn module which is configured for:

in response to the AEP storage receiving the response message of storing unsuccessfully that sent by the clone volume, stopping the clone operation, and sending a warn of cloning unsuccessfully.

According to an embodiment of the present application, the warn module is further configured for:

the warn of cloning unsuccessfully is sent to the administrator's mobile device and e-mail box via the network, and displayed on the display device where the AEP storage is located.

According to an embodiment of the present application, the creation module is further configured for:

by using a LVM snapshot management interface, creating a snapshot of the AEP storage.

According to an embodiment of the present application, the monitor module is further configured for:

on the basis of a listwatch mechanism of Kubernetes, monitoring data of a storage volume in other nodes of the cluster.

According to another aspect of embodiments of the present application, a computer apparatus is provided, the computer apparatus includes:

at least one processor; and
 a memory, the memory stores computer instructions that are capable of being operated on the processor, and when the instruction is executed by the processor, the steps of any one of the above-mentioned methods are implemented.

According to another aspect of embodiments of the present application, a computer-readable storage medium is provided, a computer program is stored in the non-transitory computer-readable storage medium, when the computer program is executed by a processor, the steps of any one of the above-mentioned methods are implemented.

The present application has the following beneficial technical effects: according to the method for cross-node cloning of the storage volume provided by the embodiment of the present application, by using pmem-csi, creating AEP storage in a node of a cluster, and monitoring whether a clone volume of the AEP storage exist in the other nodes of the cluster; in response to that a clone volume of the AEP storage is monitored in the other nodes of the cluster, stopping the AEP storage and the clone volume; creating a snapshot of the AEP storage, and recovering the AEP storage; after transmitting snapshot data of the AEP storage to the clone volume, starting the clone volume. By using technical solution of the present application, the problem of application migration and data backup of an AEP storage volume used in a cloud platform is capable to be solved.

BRIEF DESCRIPTION OF THE DRAWINGS

In order to illustrate the specific embodiments of the present application or the technical solutions in the prior art more clearly, the drawings that are needed in the description of the specific embodiments or the prior art will be briefly introduced below. Apparently, the drawings in the following description are some embodiments of the present application, and other drawings may be obtained according to these drawings without creative work for a person skilled in the art.

DETAILED DESCRIPTION

In order to make the purpose, technical solution and advantages of the present application more clearly, embodiments of the present application will be further described in details with reference to specific embodiments and the attached drawings.

Figure 1:
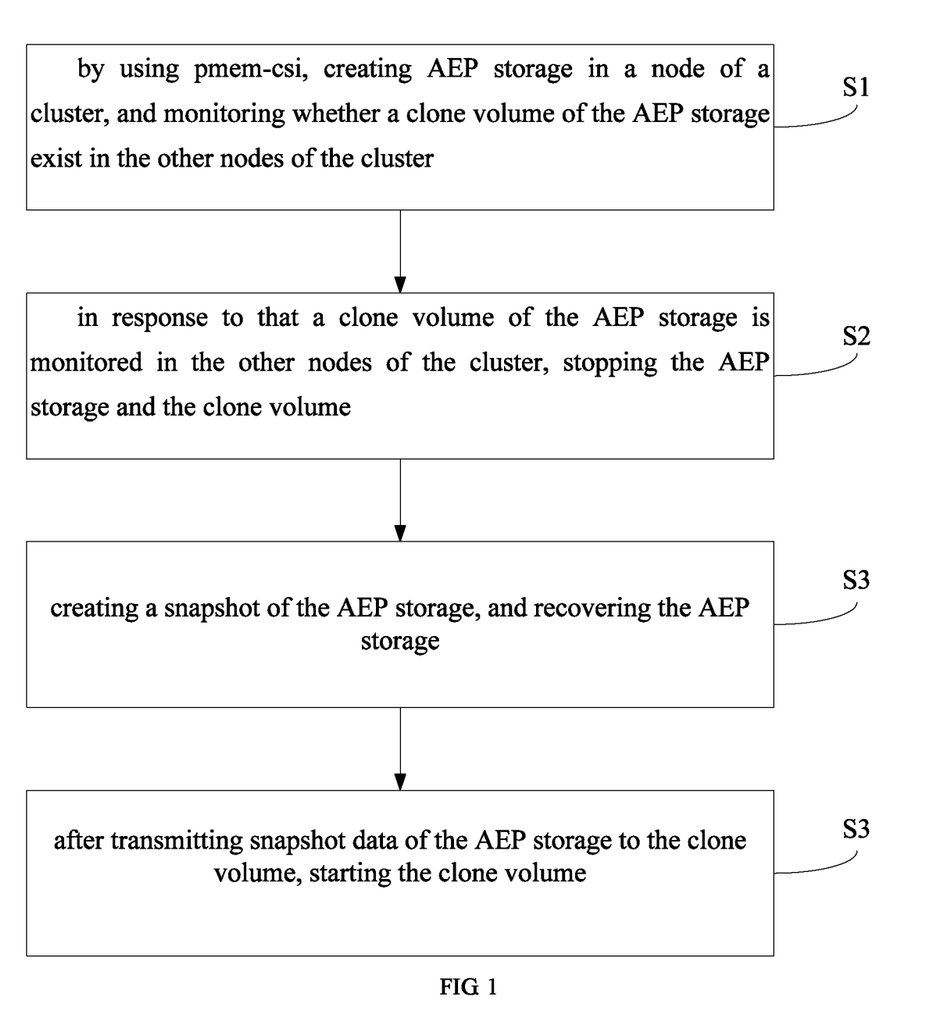
FIG. 1 is a schematic flowchart of the method for cross-node cloning of the storage volume according to an embodiment of the present application.

Based on the above purpose, according to a first aspect of the embodiment of the present application, an embodiment of a method for cross-node cloning of a storage volume is proposed. FIG. 1 shows a schematic flow chart of the method.

As shown in FIG. 1, the method may include the following steps:

S1, by using pmem-csi, creating AEP storage in a node of a cluster, and monitoring whether a clone volume of the AEP storage exist in other nodes of the cluster.

A listwatch mechanism based on Kubernetes is able to monitor clone events of the storage volume and coordinate data transmission on each of nodes, and so that is capable to make the cross-node cloning of the storage volume to be completed orderly. When it is monitored that the storage in other nodes is a clone volume of the AEP storage, the cross-node clone of the AEP storage needs to be done by using the following method.

S2, in response to that a clone volume of the AEP storage is monitored in other nodes of the cluster, stopping the AEP storage and the clone volume.

When a clone volume of the AEP storage is monitored in other nodes, it is necessary to stop both the AEP storage and the clone volume to prevent new data from being written in when the data in the AEP storage is cloned cross-node.

S3, creating a snapshot of the AEP storage, and recovering the AEP storage.

By using a LVM snapshot management interface, creating the snapshot of the AEP storage, and recovering the AEP storage after the snapshot is created, and the cross-node clone of the AEP storage may be completed merely by transferring the data in the snapshot into the clone volume.

S4, starting the clone volume after transmitting snapshot data of the AEP storage to the clone volume.

By slicing the data, the snapshot data of the AEP storage may be transferred to the clone volume. Firstly, the snapshot data of the AEP storage is divided into a plurality of data slices according to a threshold size, and sending one data slice of the snapshot data of the AEP storage to the clone volume, by the clone volume, storing the received data slice, and sending a response message to the AEP storage, and notifying the AEP storage that it is capable of continuing to send the data slice. If the AEP storage receives the response message of storing successfully sent by the clone volume, sending next data slice of the snapshot data of the AEP storage to the clone volume, and the clone volume stores the received second data slice. After the data slice is stored successfully, a response message is sent back to the AEP storage, and the above process is repeated until all the data are successfully stored in the clone volume. The Clone volume will combine the received data slices into complete data in sequence, and the cross-node clone operation of the AEP storage is completed at this time. If a problem occurs in the transmission process of a certain data slice, or the time for sending the response message exceeds a time threshold, the AEP storage will resend the last transmitted data slice, and the clone volume will perform duplicate check process on the received data slice and delete the same duplicate data slice. If the same problem occurs twice in the transmission of the same data slice, it is necessary to send a warn of cloning unsuccessfully to the administrator and stop the cloning operation. The warn of cloning unsuccessfully may be sent to an administrator's mobile device and e-mail via the network, and displayed on a display device that the AEP storage is located, and so that the administrator is notified in time for processing.

The AEP storage created by using pmem-csi is uncapable to perform cross-node backup on the storage volume, because AEP is a local storage, and the AEP storage volume may not be cloned cross-node. By the listwatch mechanism of Kubernetes, monitoring the storage volume on the Kubernetes. And when the storage volume that needs to be cloned is monitored, a clone operation may be performed cross-node.

By means of the technical solution of the present application, the problem of application migration and data backup of an AEP storage volume used in a cloud platform may be solved.

According to a embodiment of the present application, the method further includes:

according to a threshold size, dividing the snapshot data of the AEP storage into a plurality of data slices. The complete data is transmitted in data slices may reduce the transmission pressure of the network within the same time, and the probability of data transmission errors is also reduced, which is more conducive to cloning the data completely and rapidly.

According to a embodiment of the present application, the step of, starting the clone volume after transmitting snapshot data of the AEP storage to the clone volume includes:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume, until all the data is successfully stored in the clone volume. By the clone volume, sending a response message of storing successfully to the AEP storage after receiving and successfully storing every one data slice. The AEP storage will send the next data slice after receiving the response message of storing successfully, until all the data slices are sent. When all the data slices in the AEP storage are sent, the AEP storage will send a message that data transmission is completed to the clone volume. The clone volume will store the received data slices according to the order of transmission, and after receiving the message that data transmission is completed that sent by the AEP storage, the data slices will be merged into complete data according to the stored data and stored in the clone volume.

According to a embodiment of the present application, the method further includes:

in response to the AEP storage receiving the response message of storing unsuccessfully that sent by the clone volume, stopping the clone operation and sending a warn of cloning unsuccessfully. If a problem occurs in the transmission process of a certain data slice, or the time for sending the response message exceeds a time threshold, the AEP storage will resend the last transmitted data slice, and the clone volume will perform duplicate check process on the received data slice and delete the same duplicate data slice. If the same problem occurs twice in the transmission of the same data slice, it is necessary to send a warn of cloning unsuccessfully to the administrator and stop the clone operation. The warn of cloning unsuccessfully may be sent to an administrator's mobile device and e-mail via the network, and displayed on a display device that the AEP storage is located, and so that the administrator is notified in time for processing.

According to a embodiment of the present application, the step of, in response to the AEP storage receiving the response message of storing unsuccessfully that sent by the clone volume, stopping the clone operation and sending a warn of cloning unsuccessfully includes:

the warn of cloning unsuccessfully is sent to the administrator's mobile device and e-mail box via the network, and displayed on the display device where the AEP storage is located.

According to a embodiment of the present application, the step of, in response to that a clone volume of the AEP storage is monitored in other nodes of the cluster, stopping the AEP storage and the clone volume includes:

in response to that a clone volume of the AEP storage is monitored in the other nodes of the cluster, by using a freeze command: fsfreeze-freeze, freezing the AEP storage and the clone volume.

According to a embodiment of the present application, the step of, creating a snapshot of the AEP storage, and recovering the AEP storage includes:

by means of a name of the AEP storage, finding a mapped host directory;

by means of a liswatch mechanism, acquiring data of the AEP storage in the host directory, wherein the data include a capacity of the AEP storage;

setting a name of a snapshot to be created, and transmitting the name, the capacity and a directory parameter of the snapshot into a lvm snapshot interface to create the snapshot of the AEP storage;

in response to that the snapshot of the AEP storage is created, recovering the AEP storage.

According to a embodiment of the present application, the lvm snapshot interface is lvcreate-L xxxxGB-s-n lv_image_snap/dev/vg_image/lv_image, wherein -L xxxxGB is the size of the snapshot to be created, -s is the snapshot to be created, -n lv_image_snap is the snapshot to be created with the name of lv_image_snap, and/dev/vg_image/lv_image is a logical volume of the snapshot to be created.

According to a embodiment of the present application, the step of, by using the pmem-csi, creating the AEP storage in the node of the cluster, and monitoring whether a clone volume of the AEP storage exist in the other nodes of the cluster includes:

on the basis of a listwatch mechanism of Kubernetes, monitoring data of a storage volume in other nodes of the cluster;

determining whether the monitored data carry a node datum tag of the AEP storage;

in response to that the node datum tag of the AEP storage is carried by the monitored data, determining that the storage volume in other nodes is a clone volume of the AEP storage.

By means of the technical solution of the present application, the problem of application migration and data backup of the AEP storage volume used in the cloud platform may be solved.

It should be noted that, a person skilled in the art may understand that all or part of the processes of the methods of the above-mentioned embodiments may be completed by instructing related hardware by means of a computer program, the program may be stored in a non-transitory computer-readable storage medium, and when the program is executed, it may include the processes of the embodiments of the above-mentioned methods. Wherein the storage medium may be a magnetic disk, an optical disk, a Read-Only Memory (ROM) or a Random AccessMemory (RAM) and the like. The embodiment of the computer program above-mentioned may achieve the same or similar effects as the corresponding embodiments of any method described above.

In addition, the method disclosed according to the embodiment of the present application may also be realized as a computer program executed by a CPU, the computer program may be stored in a non-transitory computer-readable storage medium. When the computer program is executed by the CPU, the above function defined in the method disclosed in the embodiment of the present application is executed.

Figure 2:
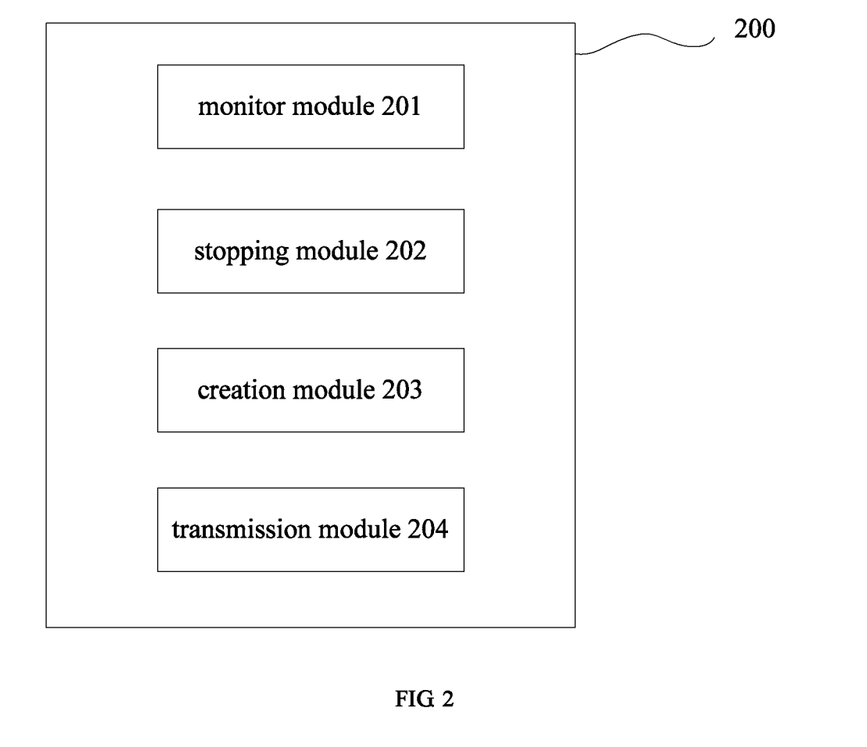
FIG. 2 is a schematic diagram of the device for cross-node cloning of the storage volume according to an embodiment of the present application.

Based on the above purpose, according to a second aspect of the embodiments of the present application, a device for cross-node cloning of a storage volume is proposed. As shown in FIG. 2, the device 200 includes:

a monitor module 201, configured to create AEP storage in a node of a cluster by using pmem-csi, and monitor whether a clone volume of the AEP storage exist in the other nodes of the cluster;

a stopping module 202, configured to stop the AEP storage and the clone volume in response to that a clone volume of the AEP storage is monitored in other nodes of the cluster;

a creation module 203, configured to recover the AEP storage, after creating a snapshot of the AEP storage;

a transmission module 204, configured to start the clone volume, after transmitting snapshot data of the AEP to the clone volume.

According to a embodiment of the present application, the device further includes a dividing module which is configured for:

according to a threshold size, dividing the snapshot data of the AEP storage into a plurality of data slices.

According to a embodiment of the present application, the transmission module is further configured for:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume, until all the data is successfully stored in the clone volume.

According to a embodiment of the present application, the device further includes a warn module which is configured for:

in response to the AEP storage receiving the response message of storing unsuccessfully that sent by the clone volume, stopping the clone operation, and sending a warn of cloning unsuccessfully.

According to a embodiment of the present application, the warn module is further configured for:

the warn of cloning unsuccessfully is sent to the administrator's mobile device and e-mail box via the network, and displayed on the display device where the AEP storage is located.

According to a embodiment of the present application, the creation module 203 is further configured for:

by using a LVM snapshot management interface, creating a snapshot of the AEP storage.

According to a embodiment of the present application, the monitor module 201 is further configured for:

on the basis of a listwatch mechanism of Kubernetes, monitoring data of a storage volume in other nodes of the cluster.

Figure 3:
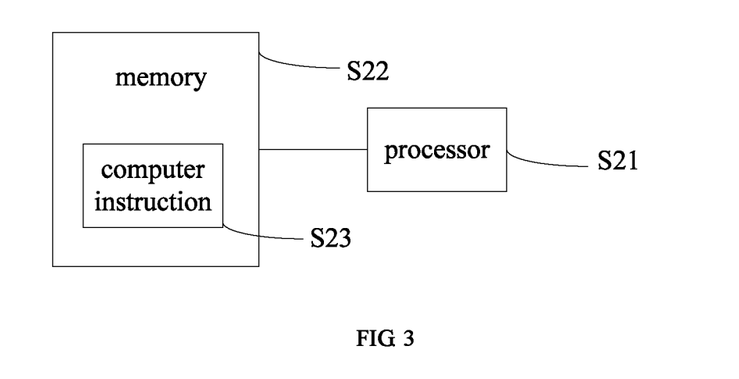
FIG. 3 is a schematic diagram of the computer device according to an embodiment of the present application.

Based on the above purpose, according to a third aspect of the embodiments of the present application, a computer device is proposed. As shown in FIG. 3, the embodiment of the present application includes the following devices:

at least one processor S21; and a memory S22, the memory S22 stores computer instructions S23 that are capable of being operated on the processor, and when the instruction is executed by the processor, the following method is implemented:

by using pmem-csi, creating AEP storage in a node of a cluster, and monitoring whether a clone volume of the AEP storage exist in the other nodes of the cluster;

in response to that a clone volume of the AEP storage is monitored in the other nodes of the cluster, stopping the AEP storage and the clone volume;

creating a snapshot of the AEP storage, and recovering the AEP storage; and starting the clone volume, after transmitting snapshot data of the AEP storage to the clone volume.

According to a embodiment of the present application, the method further includes:

according to a threshold size, dividing the snapshot data of the AEP storage into a plurality of data slices.

According to a embodiment of the present application, the step of, starting the clone volume after transmitting snapshot data of the AEP storage to the clone volume includes:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume, until all the data is successfully stored in the clone volume.

According to a embodiment of the present application, the method further includes:

in response to the AEP storage receiving the response message of storing unsuccessfully that sent by the clone volume, stopping the clone operation and sending a warn of cloning unsuccessfully.

According to a embodiment of the present application, the step of, in response to the AEP storage receiving the response message of storing unsuccessfully that sent by the clone volume, stopping the clone operation and sending a warn of cloning unsuccessfully includes:

the warn of cloning unsuccessfully is sent to the administrator's mobile device and e-mail box via the network, and displayed on the display device where the AEP storage is located.

According to a embodiment of the present application, creating a snapshot of the AEP storage, and recovering the AEP storage includes:

by using a LVM snapshot management interface, creating a snapshot of the AEP storage.

According to a embodiment of the present application, the step of, by using pmem-csi, creating AEP storage in a node of a cluster, and monitoring whether a clone volume of the AEP storage exist in other nodes of the cluster includes:

on the basis of a listwatch mechanism of Kubernetes, monitoring data of a storage volume in other nodes of the cluster.

Figure 4:
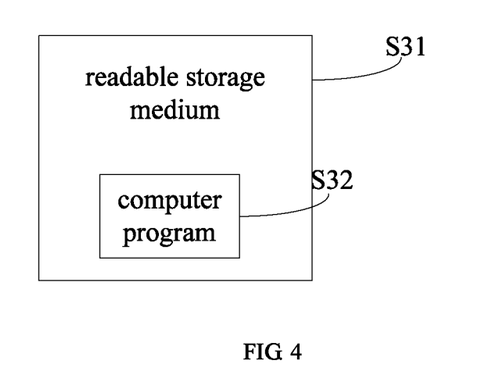
FIG. 4 is a schematic diagram of the non-transitory computer-readable storage medium according to an embodiment of the present application.

Based on the above purpose, according to a forth aspect of the embodiments of the present application, a non-transitory computer-readable storage medium is proposed. FIG. 4 is a schematic diagram of an embodiment of a non-transitory computer-readable storage medium provided by the present application. As shown in FIG. 4, the non-transitory computer-readable storage medium S31 stores a computer program S32, when the computer program S32 is executed by a processor, performing the following method:

by using pmem-csi, creating AEP storage in a node of a cluster, and monitoring whether a clone volume of the AEP storage exist in the other nodes of the cluster;

in response to that a clone volume of the AEP storage is monitored in the other nodes of the cluster, stopping the AEP storage and the clone volume;

creating a snapshot of the AEP storage, and recovering the AEP storage; and starting the clone volume after transmitting snapshot data of the AEP storage to the clone volume.

According to a embodiment of the present application, the method further includes:

according to a threshold size, dividing the snapshot data of the AEP storage into a plurality of data slices.

According to a embodiment of the present application, the step of, starting the clone volume after transmitting snapshot data of the AEP storage to the clone volume includes:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume, until all the data is successfully stored in the clone volume.

According to a embodiment of the present application, the method further includes:

in response to the AEP storage receiving the response message of storing unsuccessfully that sent by the clone volume, stopping the clone operation and sending a warn of cloning unsuccessfully.

According to a embodiment of the present application, the step of, in response to the AEP storage receiving the response message of storing unsuccessfully that sent by the clone volume, stopping the clone operation and sending a warn of cloning unsuccessfully includes:

the warn of cloning unsuccessfully is sent to the administrator's mobile device and e-mail box via the network, and displayed on the display device where the AEP storage is located.

According to a embodiment of the present application, creating a snapshot of the AEP storage, and recovering the AEP storage includes:

by using a LVM snapshot management interface, creating a snapshot of the AEP storage.

According to a embodiment of the present application, the step of, by using the pmem-csi, creating AEP storage in the node of the cluster, and monitoring whether the clone volume of the AEP storage exist in the other nodes of the cluster includes:

on the basis of a listwatch mechanism of Kubernetes, monitoring data of a storage volume in other nodes of the cluster.

In addition, the method disclosed according to the embodiment of the present application may also be implemented as a computer program executed by a processor, the computer program may be stored in a non-transitory computer-readable storage medium. When the computer program is executed by the processor, the above-mentioned functions defined in the method disclosed in the embodiment of the present application are executed.

In addition, the above-mentioned steps of the method and units of the system may also be implemented by using a controller and a non-transitory computer-readable storage medium for storing a computer program that enables the controller to implement the function of the above-mentioned steps or units.

A person skilled in the art will further appreciate that, various illustrative logical blocks, modules, circuits, and algorithm steps described in connection with the disclosure herein may be implemented as electronic hardware, computer software, or a combination of both. In order to clearly illustrate this assemblies, blocks, modules, circuits and steps have been generally described. Whether this function is implemented as software or hardware depends on the particular application and the design constraints imposed on the whole system. A person skilled in the art may implement the function in various ways for each particular application, but this implementation decision should not be interpreted as causing a departure from the scope disclosed in the embodiment of the present application.

In one or more exemplary designs, the function may be implemented in hardware, software, firmware, or any combination thereof. If implemented in software, the function may be stored on or transmitted by means of a computer-readable medium as one or more instructions or codes. The Computer-readable media include a computer storage medium and a communication media, the communication media includes any medium that facilitates transferring a computer program from one location to another. The storage media may be any available medium that may be accessed by a general purpose or special purpose computer.

The above are exemplary embodiments disclosed in the present application, but it should be noted that, various changes and modifications may be made without departing from the scope disclosed in the embodiments of the present application as defined by the claims. The functions, steps and/or actions of the method claims according to the disclosed embodiments described herein need not be performed in any particular order. In addition, although the elements disclosed in the embodiments of the present application may be described or claimed in an individual form, unless explicitly limited to the singular, they may also be understood as a plurality of.

It should be understood that, as used herein, the singular form "a" and "an" are intended to include the plural form as well, unless the context clearly supports exceptional cases. It should also be understood that, the term "and/or" as used herein refers to any and all possible combinations comprising one or more items listed in association.

The above serial numbers of the embodiments disclosed in the embodiments of the present application are merely for description, and do not represent the advantages and disadvantages of the embodiments.

A person skilled in the art may understand that all or part of the steps to implement the above-mentioned embodiment may be completed by hardware, or may be completed by a program instructing related hardware, the program may be stored in a non-transitory computer-readable storage medium, and the above-mentioned storage medium may be a read-only memory, a magnetic disk or an optical disk, and the like. It should be understood by a person skilled in the art that, the discussion of any of the above-mentioned embodiments is merely exemplary, and is not intended to imply that the scope (including claims) disclosed in the embodiments of the present application is limited to these examples; Under the idea of the embodiments of the present application, the technical features in the above-mentioned embodiments or different embodiments may also be combined, and there are many other variations in different aspects of the embodiments of the present application as described above, for the sake of brevity, they are not provided in details. Therefore, any omission, modification, equivalent substitution, improvement, and the like. made within the spirit and principle of the embodiment of the present application should be included in the protection scope of the embodiment of the present application.

The invention claimed is:

1. A method for cross-node cloning of a storage volume, executed by a processor and comprising the following steps:
   by using pmem-csi, creating AEP storage in a node of a cluster, and monitoring whether a clone volume of the AEP storage exists in other nodes of the cluster;
   in response to monitoring that a clone volume of the AEP storage exists in the other nodes of the cluster, stopping using the AEP storage and the clone volume;
   creating a snapshot of the AEP storage, and recovering using the AEP storage; and
   transmitting snapshot data of the AEP storage to the clone volume to start using the clone volume;
   wherein the step of, creating a snapshot of the AEP storage, and recovering using the AEP storage comprises:
   by means of a name of the AEP storage, finding a mapped host directory;
   by means of a liswatch mechanism, acquiring data of the AEP storage in the host directory, wherein the data comprise a capacity of the AEP storage;
   setting a name of a snapshot to be created, and transmitting the name, the capacity and a directory parameter of the snapshot into a lvm snapshot interface to create the snapshot of the AEP storage;
   in response to that the snapshot of the AEP storage is created, recovering using the AEP storage;
   wherein the step of, by using the pmem-csi, creating the AEP storage in the node of the cluster, and monitoring whether the clone volume of the AEP storage exists in the other nodes of the cluster comprises:
   on the basis of a listwatch mechanism of Kubernetes, monitoring data of the storage volume in other nodes of the cluster;
   judging whether the monitored data carry a node datum tag of the AEP storage;
   in response to that the node datum tag of the AEP storage is carried by the monitored data, determining that the storage volume in other nodes is the clone volume of the AEP storage.

2. The method according to claim 1, wherein the method further comprises:
   according to a threshold size, dividing the snapshot data of the AEP storage into a plurality of data slices.

3. The method according to claim 2, wherein the step of, transmitting snapshot data of the AEP storage to the clone volume to start using the clone volume, comprises:
   sending one data slice of the snapshot data of the AEP storage to the clone volume;
   by the clone volume, storing the received data slice, and sending a response message to the AEP storage;
   in response to the AEP storage receiving the response message of storing successfully that sent by the clone volume, sending next data slice of the snapshot data of the AEP storage to the clone volume until all the data is successfully stored in the clone volume.

4. The method according to claim 1, wherein the step of, in response to monitoring that a clone volume of the AEP storage exists in other nodes of the cluster, stopping using the AEP storage and the clone volume comprises:

in response to monitoring that the clone volume of the AEP storage exists in other nodes of the cluster, by using a freeze command: fsfreeze-freeze, freezing the AEP storage and the clone volume.

5. The method according to claim 1, wherein the method further comprises:

in response to the AEP storage receiving the response message of storing unsuccessfully that sent by the clone volume, stopping the clone operation, and sending a warn of cloning unsuccessfully.

6. The method according to claim 5, wherein, the step of, in response to the AEP storage receiving the response message of storing unsuccessfully that sent by the clone volume, stopping the clone operation, and sending a warn of cloning unsuccessfully further comprises:

the warn of cloning unsuccessfully is sent to the administrator's mobile device and e-mail box via the network, and displayed on the display device where the AEP storage is located.

7. The method according to claim 5, wherein, the step of, in response to the AEP storage receiving the response message of storing unsuccessfully that sent by the clone volume, stopping the clone operation, and sending a warn of cloning unsuccessfully further comprises:

the warn of cloning unsuccessfully is displayed on the display device where the AEP storage is located.

8. A computer device, comprising:

at least one processor; and a memory storing computer instructions that, when executed by the processor, cause the processor to implement steps of:

by using pmem-csi, creating AEP storage in a node of a cluster, and monitoring whether a clone volume of the AEP storage exists in other nodes of the cluster;

in response to monitoring that a clone volume of the AEP storage exists in the other nodes of the cluster, stopping using the AEP storage and the clone volume;

creating a snapshot of the AEP storage, and recovering using the AEP storage; and transmitting snapshot data of the AEP storage to the clone volume to start using the clone volume;

wherein the step of, creating a snapshot of the AEP storage, and recovering using the AEP storage comprises:

by means of a name of the AEP storage, finding a mapped host directory;

by means of a liswatch mechanism, acquiring data of the AEP storage in the host directory, wherein the data comprise a capacity of the AEP storage;

setting a name of a snapshot to be created, and transmitting the name, the capacity and a directory parameter of the snapshot into a lvm snapshot interface to create the snapshot of the AEP storage;

in response to that the snapshot of the AEP storage is created, recovering using the AEP storage;

wherein the step of, by using the pmem-csi, creating the AEP storage in the node of the cluster, and monitoring whether the clone volume of the AEP storage exists in the other nodes of the cluster comprises:

on the basis of a listwatch mechanism of Kubernetes, monitoring data of the storage volume in other nodes of the cluster;

judging whether the monitored data carry a node datum tag of the AEP storage;

in response to that the node datum tag of the AEP storage is carried by the monitored data, determining that the storage volume in other nodes is the clone volume of the AEP storage.

9. The computer device according to claim 8, wherein the processor is further configured to implement steps of:

according to a threshold size, dividing the snapshot data of the AEP storage into a plurality of data slices.

10. The computer device according to claim 9, wherein the step of, transmitting snapshot data of the AEP storage to the clone volume to start using the clone volume, comprises:

sending one data slice of the snapshot data of the AEP storage to the clone volume;

by the clone volume, storing the received data slice, and sending a response message to the AEP storage;

in response to the AEP storage receiving the response message of storing successfully that sent by the clone volume, sending next data slice of the snapshot data of the AEP storage to the clone volume until all the data is successfully stored in the clone volume.

11. The computer device according to claim 8, wherein the step of, in response to monitoring that a clone volume of the AEP storage exists in other nodes of the cluster, stopping using the AEP storage and the clone volume comprises:

in response to monitoring that the clone volume of the AEP storage exists in other nodes of the cluster, by using a freeze command: fsfreeze-freeze, freezing the AEP storage and the clone volume.

12. The computer device according to claim 8, wherein the processor is further configured to implement steps of:

in response to the AEP storage receiving the response message of storing unsuccessfully that sent by the clone volume, stopping the clone operation, and sending a warn of cloning unsuccessfully.

13. The computer device according to claim 12, wherein, the step of, in response to the AEP storage receiving the response message of storing unsuccessfully that sent by the clone volume, stopping the clone operation, and sending a warn of cloning unsuccessfully further comprises:

the warn of cloning unsuccessfully is sent to the administrator's mobile device and e-mail box via the network.

14. A non-transitory computer readable storage medium, in which a computer program is stored, wherein when the computer program is executed by a processor, the method of claim 1 is performed.

* * * * *